United States Patent [19]
Howe

[11] 4,255,764
[45] Mar. 10, 1981

[54] FILM SCANNER EMPLOYING OPTICAL SPLICE TECHNIQUE FOR FRAME-RATE CONVERSION

[75] Inventor: Dennis G. Howe, Pittsford, N.Y.
[73] Assignee: Eastman Kodak Company, Rochester, N.Y.
[21] Appl. No.: 68,032
[22] Filed: Aug. 20, 1979
[51] Int. Cl.³ .............................................. H04N 3/36
[52] U.S. Cl. ................................................... 358/214
[58] Field of Search ............................... 358/214–216, 358/130–132, 6, 206

[56] References Cited
U.S. PATENT DOCUMENTS
| | | | |
|---|---|---|---|
| 2,258,311 | 10/1941 | Adams | 358/214 |
| 4,148,071 | 4/1979 | Zinchuk | 358/214 |

OTHER PUBLICATIONS
Wright et al., "Solid State Sensors: The Use of a Single Dimension 512 Element Array for Film Scanning", BBC Research Dept. Report No. 1973/32.
Childs et al., "An Experimental Telecine Using a Line-Array CCD Sensor", SMPTE Journal, Apr. 1978, vol. 87, pp. 209–213.

Primary Examiner—John C. Martin
Attorney, Agent, or Firm—Thomas H. Close

[57] ABSTRACT

A frame-rate converting film scanner suitable for use with a solid-state line sensing array for producing a television signal from motion picture film is disclosed. The scanner is capable of projecting film at continuously moving projection rates that are not necessarily submultiples of the standard television field rate. The scanner includes a rotating multifacet mirror such as a reflecting polygon that sweeps a succession of images of the moving film past the line scanner at a rate sufficient to cause the line scanner to scan one full frame in the time required for generating a standard television field. Each successive image deflected by the polygon is displaced from the preceding image by one film frame height, whereby, the transition from one image to the next, as the successive images sweep across the line scanner, proceeds from a location in one frame to a corresponding location in an adjacent frame. Frame-rate conversion is thus achieved by causing some or all of the video fields to be comprised of portions of scans of adjacent frames of the film.

5 Claims, 6 Drawing Figures

FILM SCANNER EMPLOYING OPTICAL SPLICE TECHNIQUE FOR FRAME-RATE CONVERSION

BACKGROUND OF THE INVENTION

1. Field of the Invention

This invention relates to film scanners, and more particularly to frame-rate converting scanners for scanning a motion picture frame projected at a desired frame rate to product a television signal at a field rate that is not necessarily a whole number multiple of the projection frame rate.

2. Discussion Related to the Problem

Apparatus for scanning motion picture film to produce a television signal is well known. In such film scanning apparatus, a film frame is scanned in a direction generally perpendicular to the length of the film at a standard television line rate. The line scan is displaced in a direction generally parallel with the length of the film at a standard television field rate. In the past, the line scan has been accomplished by flying spot scanners employing Nipkow discs, movable reflecting elements, or cathode ray tubes. The use of a solid-state line sensing array as an alternative to a flying spot scanner to provide the line scanning function in a film scanner has been proposed. See D. T. Wright, "Solid-State Sensors; The Use of a Single Dimension 512-Element Array for Film Scanning", BBC Research Department Report No. 1973/32. The potential advantages of a line sensing array over a flying spot scanner are numerous, including: reduced size, weight, maintenance and cost.

These advantages make the solid-state line sensing array particularly attractive for use in a film scanner for displaying amateur movie film on a home television set. However, since standard motion picture frame rates are not the same as standard television field rates, the scanning apparatus must provide some form of frame-rate conversion, whereby the film is moved at a desired projection frame rate, but the scan of a frame is accomplished at the standard TV field rate.

In experiments performed by the BBC on a film scanner employing a line sensing array, frame-rate conversion was accomplished by projecting a film that was exposed at 24 frames per second, onto a solid-state line sensing array, at the slightly faster rate of 25 frames per second. The signal, generated by scanning a frame with the line sensing array, was held in a field store device and read out of the device two times in succession at twice the 25 frame per second rate, resulting in a TV signal having a 50 field per second rate. This is the standard field rate for European television Alternatively, it has been suggested to interpose a device such as a movable reflector or rotating multifacet mirror such as a reflecting polygon in the optical path between the film and the line sensing array, and to move the device so as to cause the line sensing array to scan each frame twice. See I. Childs and J. Sanders, "An Experimental Telecine Using a Line-Array CCD Sensor", SMPTE Journal, Vol. 87, No. 4, April 1978.

Projecting a 24 frame per second film at 25 frames per second introduces a projection rate error of about 4%. Unfortunately, amateur motion picture film, i.e. regular 8 and Super 8, is commonly exposed at 18 frames per second and the standard U.S. television field rate is 60 fields per second. If the 18 frame per second film were projected at 20 frames per second, and a 3 to 1 frame-rate conversion were effected in some way, a projection rate error of 11% would be introduced. While a 4% error may be acceptable, an 11% projection rate error would certainly be noticeable and objectionable. The present invention solves the problem of exact frame-rate conversion in a film scanner and includes the added advantage that various projection rates may be effected the scanner.

SOLUTION—SUMMARY OF THE INVENTION

The apparatus for scanning motion picture film according to the present invention continuously moves the film through the film gate at a rate that is not a whole number submultiple of the standard field rate. A projected image of the moving film is scanned by a solid-state line sensor, line by line, in a direction generally perpendicular to the length of the film, at a standard television line rate to produce a television signal. The line scan is optically displaced in a direction generally parallel with the length of the film at a standard television field rate. The scanner occasionally discontinues scanning a film frame at some location within the frame and continues scanning an adjacent frame at a corresponding location, thereby effecting an "optical splice" between portions of adjacent frames to complete a standard field scan. In this way, frame-rate conversion between film frame rates and video field rates that are not related by whole number multiples may be effected with relatively simple apparatus.

In a preferred embodiment of the invention, the film scanner includes a stationary film gate defining an opening having a top and bottom edge. The film is moved continuously through the film gate at a controlled rate and an image of the film in the gate is projected onto a solidstate line sensing array. The line sensing array scans the image of the film line by line at a standard line rate to produce a television signal. A mirror having a plurality of reflecting facets disposed about a central axis is journalled for rotation about the axis and is disposed so as to reflect the light forming the projected image of the film onto the line sensing array. The facets are arranged such that reflected images from adjacent facets are displaced from each other by substantially one film frame height. The mirror is rotated about its axis at a controlled rate to cause the images, due to reflections from its facets, to sweep the line sensing array in a direction generally parallel with the length of the film. The film is controlled to move at X frames per second and the mirror is rotated at Y facets per second such that X+Y is equal to a standard television field rate, where X is a non-integral submultiple of the television field rate. Frame-rate conversion is achieved by forming a television field from portions of adjacent film frames whenever the film scan reaches an edge of the film gate before the scan of a complete film frame has been completed.

In one form of the preferred embodiment, the opening defined by the film gate, from top to bottom edge, is within plus or minus ½ television scan line widths of one film frame height, whereby optically spliced frame portions neatly abut. For an NTSC television signal, the tolerance on the opening defined by the film gate would be plus or minus ½ of a film frame height divided by 525, since there are 525 lines in an NTSC television frame.

In another form of the preferred embodiment, the opening defined by the film gate is larger than one film frame height, thereby allowing identical lines of adjacent film frames to be simultaneously imaged on the line sensing array whenever the polygon mirror is rotated to an angle such that adjacent facets can simultaneously view film near the top and bottom of the extended film gate opening. The apparatus further includes means for vignetting the simultaneous images on the sensor, formed by light reflected from the adjacent polygon facets, from the film lines residing near the top and bottom extended gate edges so that the overlapping frame portions are smoothly blended into one another. By utilizing the optical splicing technique, relatively simple apparatus can achieve exact frame-rate conversion for a variety of projection rates including still frames.

DESCRIPTION OF THE DRAWINGS

The invention will be described with reference to the drawings, wherein.

DESCRIPTION OF THE PREFERRED EMBODIMENTS

Certain features disclosed but not claimed in this application are the subject of copending U.S. Patent Application Ser. No. 68,031 entitled OPTICAL CONFIGURATIONS FOR A ROTATING POLYGON FILM SCANNER by D. G. Howe, filed on the same date as the present application.

Figure 1:
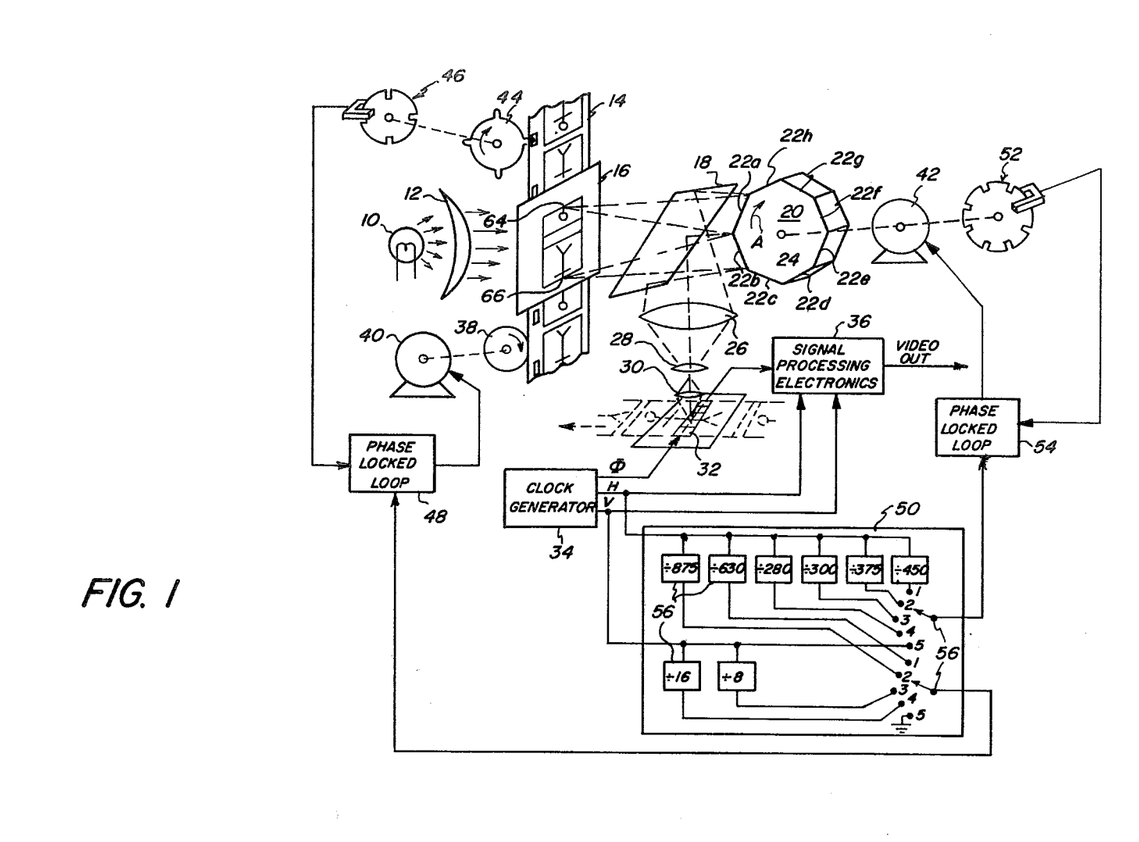
FIG. 1 is an overall schematic diagram of the film scanning apparatus according to the present invention.

The frame-rate converting film scanner according to the present invention, shown schematically in FIG. 1, includes a light source 10 and a condensing lens 12 for illuminating a portion of motion picture film 14 in a film gate 16. Light from the film gate passes through a beam splitter 18 and is reflected from reflecting polygon 20. The reflecting polygon has a plurality of facets 22a, b, c ... that are arranged about an axis of rotation 24. Light reflected from the polygon facets is again reflected by the beam splitter 18 and an image of the film gate is formed by a scanning lens 26. The image is relayed by a field lens 28 and an objective lens 30 to a solid-state line sensing array, such as a charge coupled device (CCD) image sensor, 32. It should be noted that field lens 28 and objective lens 30 are not required if the line sensing array 30 is as wide as the image produced by scanning lens 26. A TV signal is generated, line by line, by clocking the CCD line sensor 32 in the standard manner with polyphase clock signals (Φ). The polyphase clock signals (101) for controlling the line sensing array, and horizontal (H) and vertical (V) synchronization signals for composing a composite video signal are generated by a clock generator 34. The output of the line sensor 32, along with the horizontal and vertical sync signals are supplied as inputs to signal processing electronics 36, which produces a standard composite video signal from the inputs in a known manner.

In operation, film may be moved through gate 16 by a capstan 38 which is driven by a motor 40. Also, polygon 20 may be rotated about axis 24 by a motor 42. From FIG. 1, it can be seen that as polygon 20 rotates, each facet, in its turn, will cause an image of the film moving through the gate, to sweep across the line sensor 32. Looking backward through the optical system, it can be imagined that as the polygon rotates, each facet causes a projected image of the line sensor to sweep across the film gate thereby sensing, line by line, the film in the gate. The disclosed geometrical arrangement of scan lens, beam splitter, rotating polygon and film gate that enables this imagined projected image of the line sensing array to remain in focus and to undergo minimal distortion as it scans across the film gate is the subject of the above-referenced copending U.S. patent application.

Figure 2:
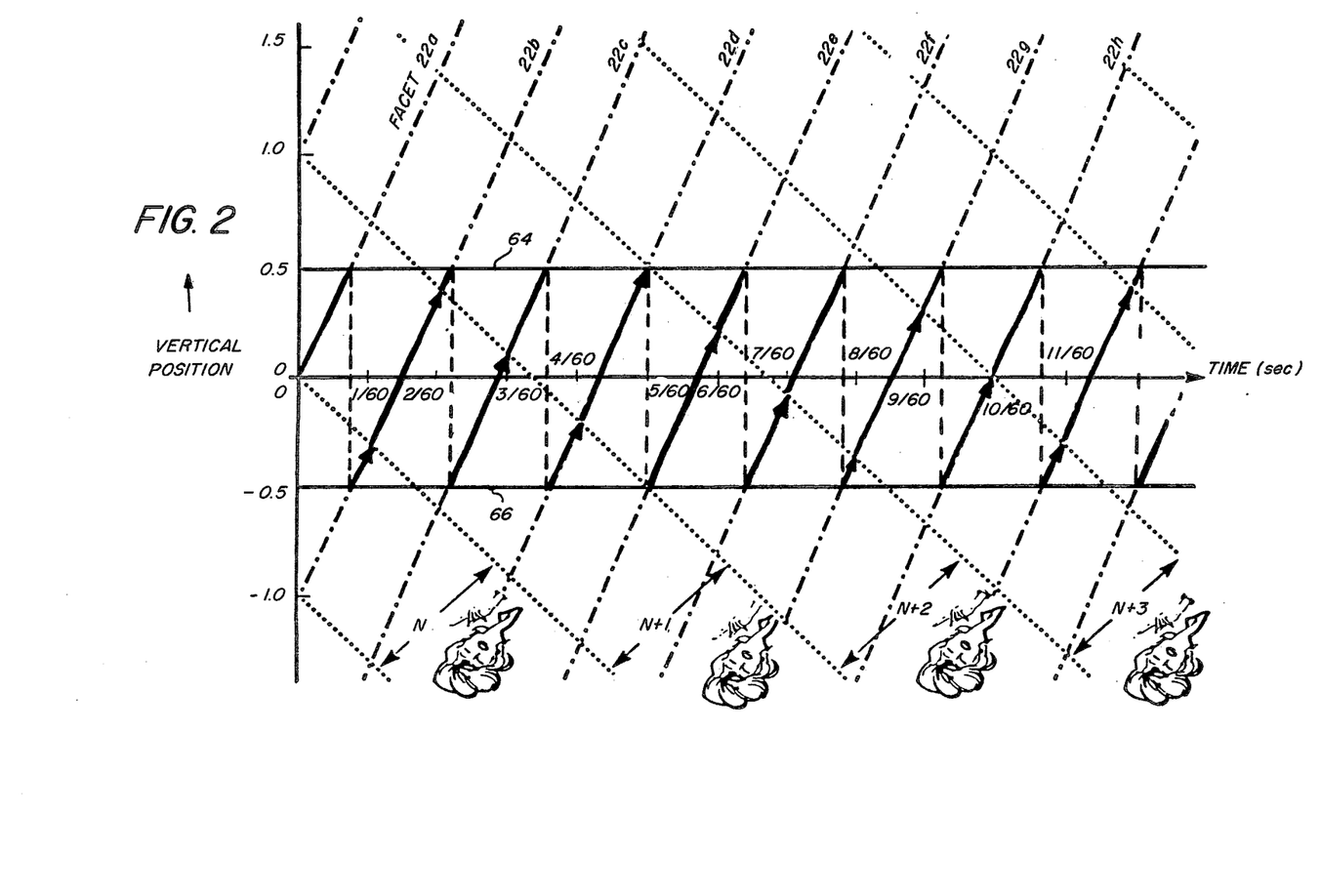
FIG. 2 is a diagram useful for explaining the optical splicing technique employed by the present invention for frame-rate conversion.

The manner in which frame-rate conversion is achieved by this apparatus can best be explained with reference to the timing diagram shown in FIG. 2. The horizontal axis of the diagram represents time and is divided into convenient units of 1/60 of a second. The vertical axis represents vertical position in the film gate and is divided into units of film frame height. Since both the film frames and the imagined projected image of the line sensor move with respect to the film gate, the motion of both are conveniently depicted in this reference system. The top and bottom of the aperture formed by film gate 16 are represented as horizontal lines 64 and 66, respectively.

If the polygon 20 is rotated, by motor 42, at 42 facets per second in the direction indicated by arrow A in FIG. 1, the path followed by the imagined projected image of the line sensing array as it is deflected by a facet of the polygon will traverse the film gate in 1/42 of a second. The chain lines slanting up from left to right in FIG. 2 depict these paths, each line scan path being labelled to correspond with the polygon facet that generated the path. The portions of the paths lying between the top and bottom of the film gate are drawn with heavy arrows, indicating that the corresponding facet is "optically active" during this time. "Optically active" as used herein means that a line portion of the image of the film gate reflected by a particular polygon facet falls upon the line sensor.

The film is continuously moved through the film gate in a direction opposite to the sweep of the imagined image of the line sensing array. Accordingly, dotted lines representing the inter-frame bars between individual film frames slant down from left to right in FIG. 2. If the film is moved through the film gate at 18 frames per second, the inter-frame bars intercept the time axis 18 times per second, as shown. A sketch of a girl subject is included at the bottom of the diagram for convenience in referring to points within the frames. The frames have been numbered consecutively from frame N through N+3 in the normal order of their passage through the film gate. The frame-rate converting scanning sequence will now be described with reference to FIG. 2. For convenience, the scanning sequence is shown as starting from the origin, i.e. in the middle of the film gate, and beginning at the top of the frame N+1. The scan by facet 22a proceeds from the top of frame N+1 until the top edge of the film gate is reached. The scan of frame N+1 is thereby terminated at about the girl's collar. Immediately upon termination of the scan by facet 22a, a scan by facet 22b of frame N commences at a location in frame N corresponding to the location in frame N+1 (i.e. the girl's collar) where the scan by facet 22a was interrupted. This transition from a location in one frame to a corresponding location in an adjacent frame is called an "optical splice" and is indicated by a vertical dashed line. The scan by facet 22b continues through the bottom of frame N thereby completing a full field scan (albeit a spliced field comprising portions from both frames N and N+1) in 1/60 of a second. The scan by facet 22b continues, completing a full field scan of frame N+1 and a partial field scan of frame N+2. The partial scan of frame N+2 ends at about the top of the girl's head in frame N+2 and is continued immediately by the scan initiated by facet 22c in frame N+1 at a corresponding location. Thus, the second "optical splice" in the scanning sequence occurs in the third field scan shown in FIG. 2. The apparatus continues scanning in the manner outlined above producing 60 full field scans every second, with an optical splice occurring whenever the scan of a frame is interrupted by the top edge of the film gate.

It is an important feature of the present invention that the facets of polygon 20 are arranged so that the successive images of the film gate, formed via reflections from adjacent polygon facets, are displaced relative to each other by one film frame height in a direction parallel to the length of the film. Due to this arrangement of the polygon facets, each successive imagined image of the line sensor projected onto the film gate will be displaced from the preceding image by one film frame height and each optical splice will match corresponding locations (i.e. lines) from adjacent film frames.

As may now be appreciated, the frame-rate conversion technique employing optical splicing is completely unrestricted by the film projection rate or the television field rate. As long as the polygon facet rate and the continuous frame projection rate are chosen such that their sum equals the required television field rate, exact frame-rate conversion will result. This most desirable feature facilitates the implementation of a variety of projection rates in the film scanning apparatus (e.g. slow or fast motion and even still frame). Returning to FIG. 1, it may be seen how a number of projection rates are implemented.

Motor 40, that drives the film via capstan 38, is controlled by a phase locked loop servo system. A sprocket wheel 44 connected to a tachometer 46 engages the film perforations to sense the film transport speed. The tachometer is designed to produce a pulse for each film frame. The signal from the tachometer is supplied as a feedback signal to a phase locked loop circuit 48. A reference signal for the phase locked loop circuit is supplied by a control electronics circuit 50. The reference signal comprises a pulse train having a frequency representing the desired projection rate. The phase locked loop servo causes the film to be transported at a frame rate determined by the reference signal.

Likewise motor 42 that drives polygon mirror 20 is controlled by a phase locked loop servo system. A tachometer 52 is connected to the shaft of motor 42 to produce a pulse for each polygon facet. The signal from tachometer 52 is supplied as a feedback signal to a phase locked loop circuit 54. A reference signal for the phase locked loop circuit is supplied by control electronics 50. The reference signal comprises a pulse train having a frequency representing the desired rotation rate in facets per second for polygon 20.

Control electronics 50 receives the horozontal (H) and vertical (V) sync signals generated by clock generator 34 and produces the required reference signals for the phase locked loops by dividing either (H) or (V) using digital electronic circuits 56 in a known manner. The various divisors employed are indicated on the divider circuits 56 shown in FIG. 1. The frequency of the horizontal sync signal for standard black-and-white television is 15,750 Hz and the frequency of the vertical sync signal is 60 Hz.

For example, an 18 pulse per second reference signal for projecting the film at 18 frames per second can be obtained from H by dividing by 875. The corresponding polygon facet rate is 42 facets per second, since 18 plus 42 equals 60. The required polygon facet rate reference signal can be obtained by dividing H by 375. Other speed combinations can be obtained in a similar manner. The control electronics 50 is shown as having 5 selectable speeds. A two layer, 5-position gang switch 56 selectively connects the outputs of the dividers to the phase locked loop circuits to achieve the following selectable speeds:

| Switch Position | Film Speed Frames/Sec. | Polygon Speed Facets/Sec. |
| --- | --- | --- |
| 1 | 25 | 35 |
| 2 | 18 | 42 |
| 3 | 7.5 | 52.5 |
| 4 | 3.75 | 52.5 |
| 5 | 0 | 60 |

To achieve a good clean optical splice, it is necessary that the transition from one fact scan to the next occur in a timely fashion. FIG. 1 shows ray traces through the optical system of the scanner at a moment when the scan line from facet 22a is on the verge of extinction by the top of the film gate and scan line from facet b is just on the verge of becoming optically active. For this situation to obtain, the film gate height must be equal to one film frame height within plus or minus ½ a scan line width, and the projected image of the top and bottom of the film gate must be substantially parallel with the line sensor. If the top and bottom edges of the one frame high film gate are not parallel, or if dirt or dust collects along these edges, the gate edges will be visible as a dark line that occurs at each optical splice. The dark lines would occur at varying vertical locations in the TV field and the number of dark lines per second would be equal to the number of optical splices per second. Dark or light lines could also occur at optical splices if the film gate becomes spaced too far from or too close, respectively, to the optical polygon center of rotation. These effects can be obscured by blending the transition from one scanning facet to the next so that no abrupt transition occurs at the optical splice and therefore no "splice" lines will be visible in the resulting TV picture. A blended splice may be effected by replacing the distinct top and bottom edges of the film gate with wedges of neutral optical density (or their optical equivalent somewhere else in the optical system). If the film being projected shrinks or stretches, the scanned frame portions at an optical splice may be discontinuous or may overlap, respectively. This would result in a discontinuity in the TV image. An additional advantage of the blended splice is that these discontinuities may be eliminated by adjusting the distance between the film gate and the polygon by an appropriate amount, an option not available when the film gate height is restricted to one film frame height.

Figure 3:
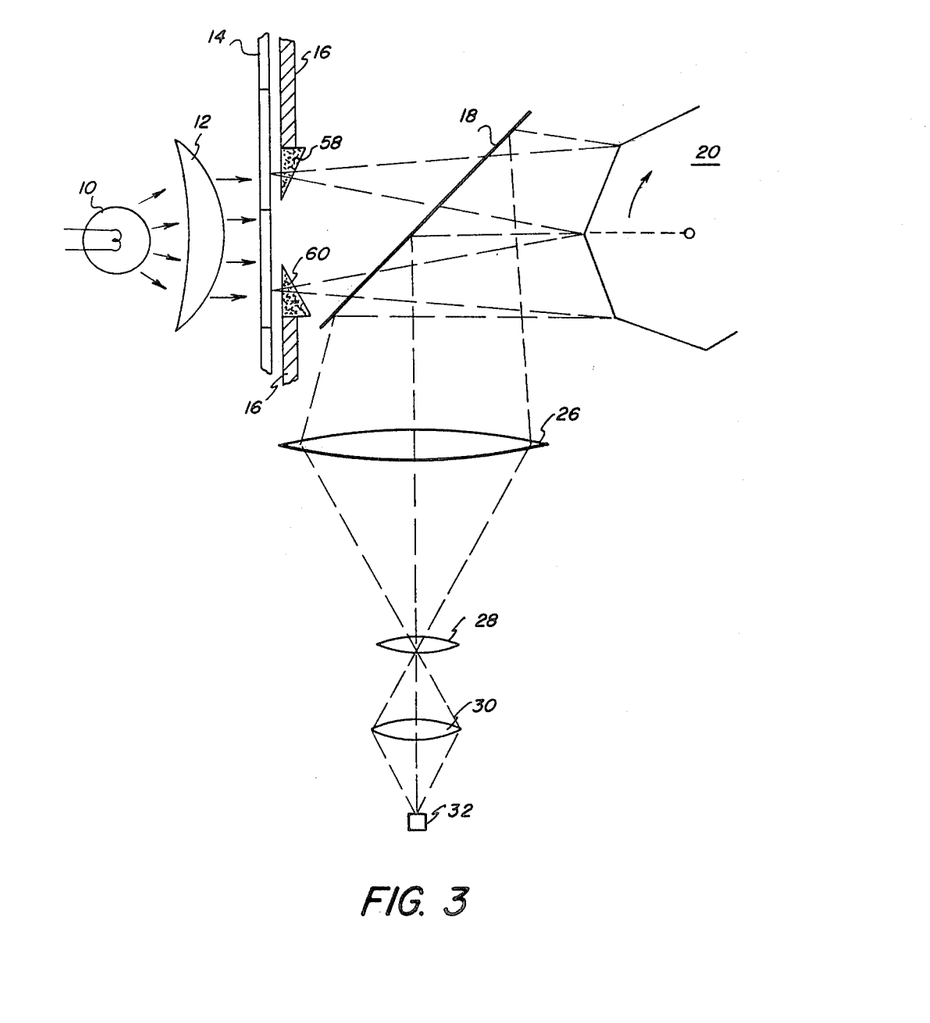
FIG. 3 is a schematic diagram showing one method of implementing the blended optical splice technique by the use of neutral density wedges in the film gate.
Figure 4:
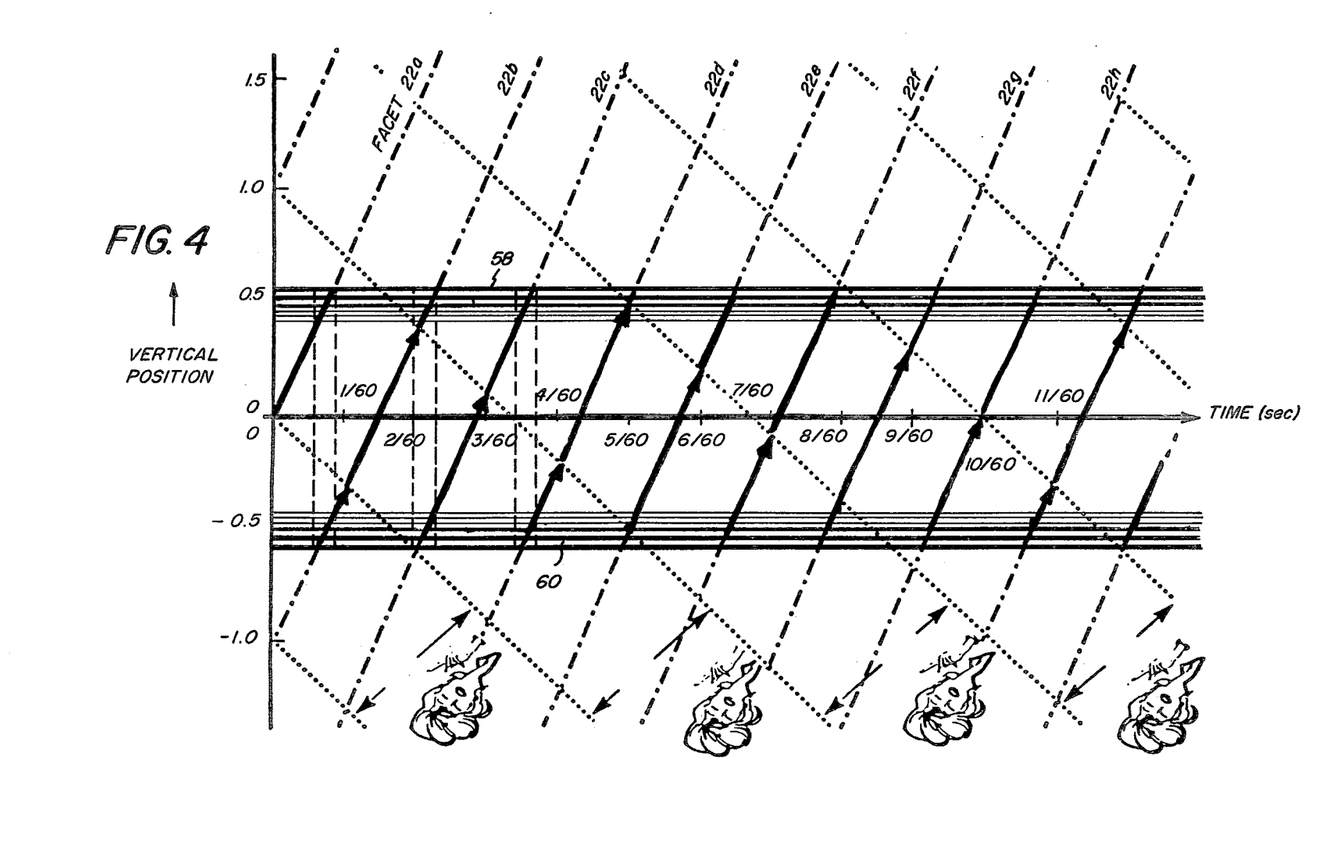
FIG. 4 is a diagram similar to FIG. 2 showing the blended optical splicing technique employed in a preferred embodiment of the present invention.

FIG. 3 is a partial schematic of the frame-rate converting film scanner according to the present invention showing the location of the neutral density wedges 58 and 60 in the top and bottom of the film gate respectively. The effects of the neutral density wedges can be seen with reference to FIG. 4. FIG. 4 is a frame-rate timing diagram similar to FIG. 2 except that the lines indicating the top and bottom edges of the film gate 44 and 46 have been replaced by a series of parallel lines indicating the location of the neutral density wedges 58 and 60. Wedge 58, replacing the top edge of the film gate, begins at about 0.4 film frames from the center of the gate and extends to about 0.6 film frames from the center. The thin lines represent a low optical density portion of the wedge and heavier lines represents higher optical density. Similarly, wedge 60, replacing the bottom edge of the film gate, begins at about 0.4 film frames below the center of the gate and extends to about 0.6 film frames below the center. The density profile and vertical position of the wedges are chosen so that the sum of the percent transmissions through two points spaced one film frame apart will total 100%. Above the top of the upper wedge and below the bottom of the lower wedge is a limiting field of view stop, either in the film gate itself or elsewhere in the optical system. The active portions of the scan paths in FIG. 4 are indicated by bold lines with arrow heads indicating the end of each field scan. As can be seen from FIG. 4, the field scans occur at multiples of 1/60 of a second as desired, but unlike the field scan shown in FIG. 2, the transition from one facet to the next is a gradual dissolve, slowly fading out from one facet while at the same time fading in to the next facet scan. As a result no abrupt transition line due to the optical splice is visible in the TV picture.

Figure 5:
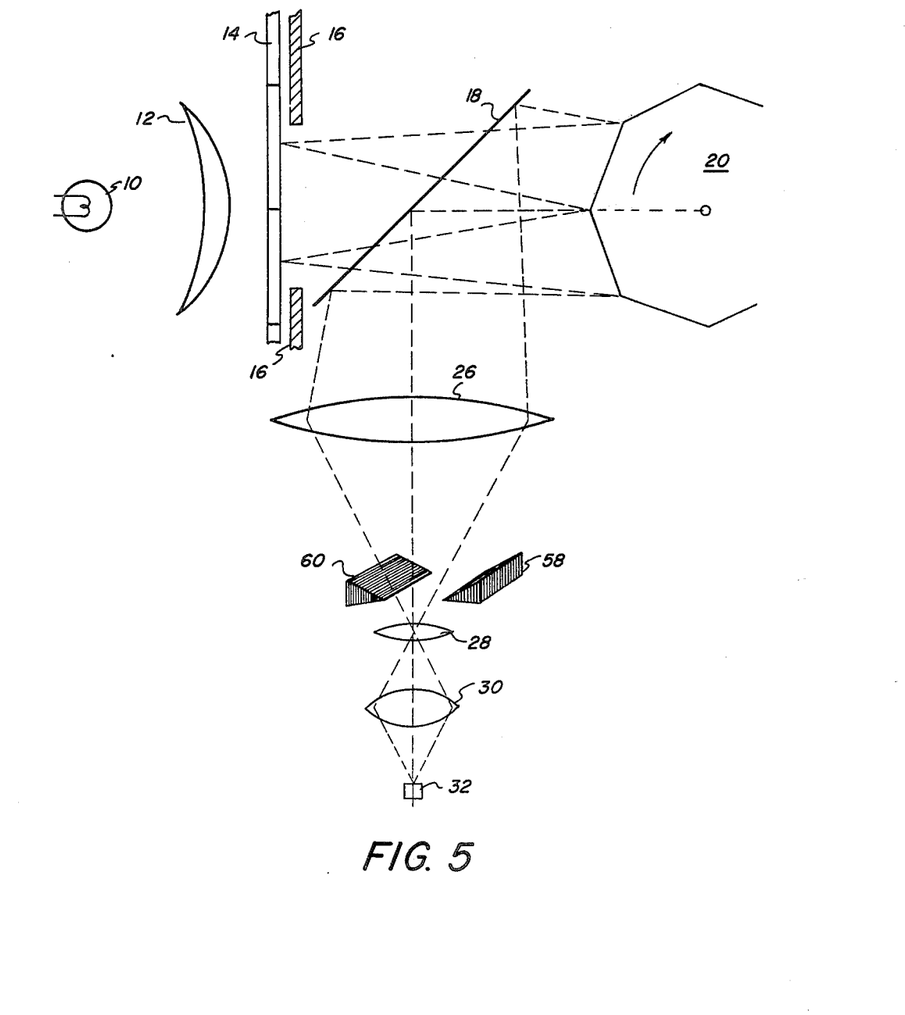
FIG. 5 is a schematic diagram which shows a preferred deployment of the neutral density wedges near a field lens.

So that the neutral density wedges, or their optical equivalent, are not subject to wear, as they would be if positioned in the film gate, it may be desirable to place them elsewhere in the optical system. A secondary image of the film gate is formed inside the field lens 18. Therefore, a pair of optical wedges placed close to the field lens will have the same effect as placing the wedges in the film gate. FIG. 5 is a partial schematic diagram of the film scanning apparatus showing the neutral density wedges 58 and 60 near the field lens 28. The dimensions and spacings of the wedges are, of course, scaled with relation to the magnification of the secondary image of the film gate in field lens 28.

Figure 6:
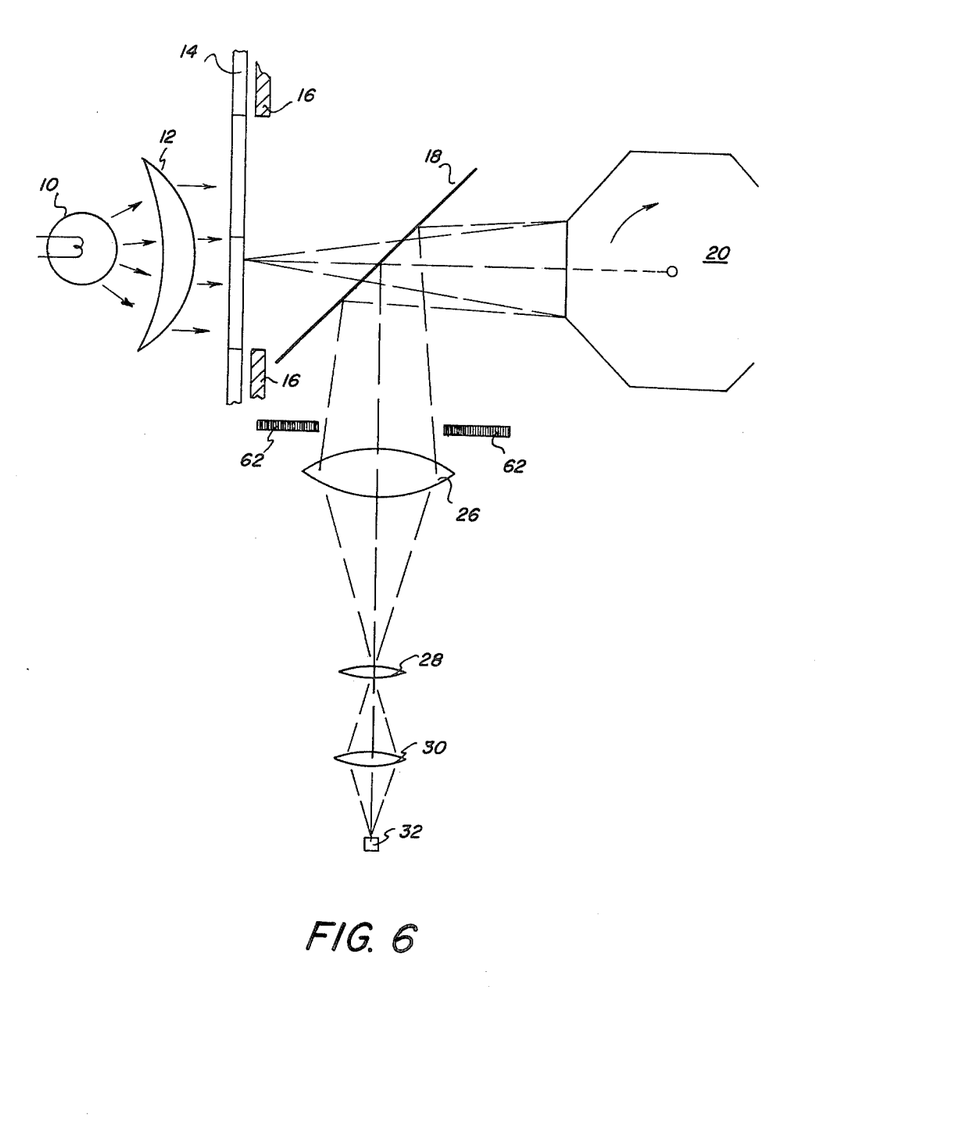
FIG. 6 is a schematic diagram showing a ray trace through the optical system of the film scanner when the center of the film gate is being scanned.

Since any dirt on the neutral density wedges, either in the film gate or at the field lens, will be in focus and therefore more likely to be visible in the television picture, a more desirable alternative is to introduce controlled vignetting at the scan or detector lens to accomplish the blended splice effect. FIG. 6 is a partial schematic diagram of the film scanner showing a ray trace through the optical system when the scan is at the middle of the gate. As can be seen from FIG. 6, the bundle of image forming light rays is centered in the scan lens when only one mirror facet is active. As seen in FIG. 5, when two facets are equally active, light collected from the two scan lines spaced one film frame height apart form two bundles of light rays that each fill half of the scan lens 26. Under this condition it is desirable that 50% of the light from each bundle be transmitted to the sensor. This can be achieved by placing a rectangular aperture stop in front of the scan lens that blocks 50% of the light in each bundle. Such an aperture 62 is shown in FIG. 6. It should be noted that with this arrangement, the film gate 16 is at least two film frame heights high. As can be seen from FIG. 6, aperture 62 has no effect on the transmission of 100% of the illumination when the scan line is centered in the film gate. It can also be seen from FIG. 6 that the vignetted scan lens 26 will always have the entire area of its entrance pupil filled with light at all scan angles and therefore, the total percentage of light flux reaching the line scanner from the film gate will be constant, thus achieving the goal of having constant total transmission through the optical wedges or in this case their optical equivalent.

The invention has been described in detail with particular reference to certain preferred embodiments thereof, but it will be understood that variations and modifications can be effected within the spirit and scope of the invention.

I claim:

1. A film scanner for producing television signals from motion picture film, comprising:

a stationary film gate, said film gate defining an opening having a top and bottom edge, the opening between the top and bottom edges of said film gate being larger than one film frame height;

means for moving the film continuously past the opening at a controlled rate;

means for projecting an image of the film in said gate;

a solid-state line sensing array for scanning the image of the film, line by line, in a direction generally perpendicular to the length of the film at a standard television line rate to produce a television signal;

multifacet mirror means having a plurality of reflecting facets disposed about a central axis, said mirror means being journalled for rotation about said axis and being disposed with respect to said projection means for reflecting the image of the film onto said array such that reflections from adjacent facets will be displaced by substantially one film frame height, whereby the reflected images of said film gate from adjacent facets overlap;

means for rotating said mirror means about said axis at a controlled rate to thereby cause an image reflected by one of said facets to sweep across said array, in effect causing said array to repeatedly vertically scan said film gate from one of said edges to the other at a controlled rate;

means for fading-in the projected image reflected by a facet at the beginning of the sweep across the line sensor and for fading-out the projected image reflected by a facet at the end of a sweep across the line sensor such that the percentage of light reaching the sensor remain substantially constant; and control means for controlling said film moving means at X frames per second and for controlling said rotating means at Y facets per second such that X+Y is equal to a standard television field rate, and wherein X is a non-integral submultiple of the television field rate, whereby exact frame-rate conversion is achieved by forming a television field from portions of two adjacent film frames whenever the vertical scan reaches an edge of the film gate before the scan of a film frame has been completed.

2. The invention claimed in claim 1, wherein:

said fading means comprises a pair of neutral density optical wedges located in the optical system at a position where a real image of the film gate is present, one of said pair being disposed adjacent the image of the top edge of said film gate and extending into the image of said opening and the other of said pair being located at the bottom edge and extending into said opening.

3. The invention claimed in claim 1 wherein:
the opening between the top and bottom edges of said film gate is substantially two film frame heights, said projecting means includes a scan lens, and said fading means comprises an aperture stop located adjacent said scan lens.

4. The invention claimed in claim 1 wherein:
the opening between the top and bottom edges of said film gate is substantially two film frame heights, said projecting means includes an objective lens and said fading means comprises an aperture stop located adjacent said objective lens.

5. Apparatus for scanning motion picture film to produce a television signal having a standard field rate, comprising:
a film gate:
means for continually moving the film at a rate of X frames per second relative to the film gate, where X is other than a whole number submultiple of the standard field rate;
means for projecting an image of a portion defined by the film gate of the continuously moving film, the image of the portion of moving film defined by the film gate being greater than one film frame height;
means for vignetting the image near the top and bottom edges,
means for forming a plurality of successive images of the projected image, each successive image being displaced from the proceeding image in the direction of the length of the film by one film frame height, whereby the overlapping frame portions are smoothly blended into one another;
line scanning means for scanning the plurality of images in a direction generally perpendicular to the length of the film at a standard TV line rate; and
means for moving the plurality of images in the direction of the length of the film at a rate equal to Y frames per second relative to said line scanning means, where X plus Y is equal to the standard television field rate, whereby exact frame-rate conversion is achieved by optically splicing the scanned images of portions of adjacent film frames to form one full video field.

* * * * *